Feb. 13, 1968  R. L. WEBER III  3,368,717
DISPENSER

Filed Oct. 24, 1965  13 Sheets-Sheet 1

INVENTOR.
ROBERT L. WEBER III
BY
*Robertson Smythe Bryant Ramacher*
ATTORNEYS

Feb. 13, 1968   R. L. WEBER III   3,368,717
DISPENSER
Filed Oct. 24, 1965   13 Sheets-Sheet 2

INVENTOR.
ROBERT L. WEBER III
BY
*Robertson Smythe Byrn & Parmelee*
ATTORNEYS

Feb. 13, 1968   R. L. WEBER III   3,368,717
DISPENSER
Filed Oct. 24, 1965   13 Sheets-Sheet 3

INVENTOR.
ROBERT L. WEBER III
BY
*Robertson Smythe Bryant Parmelee*
ATTORNEYS

Feb. 13, 1968  R. L. WEBER III  3,368,717
DISPENSER

Filed Oct. 24, 1965  13 Sheets-Sheet 4

INVENTOR
ROBERT L. WEBER III
BY
Robertson Smythe Ryan &
ATTORNEYS Parmelee

Feb. 13, 1968  R. L. WEBER III  3,368,717
DISPENSER
Filed Oct. 24, 1965  13 Sheets-Sheet 5
FIG. 10
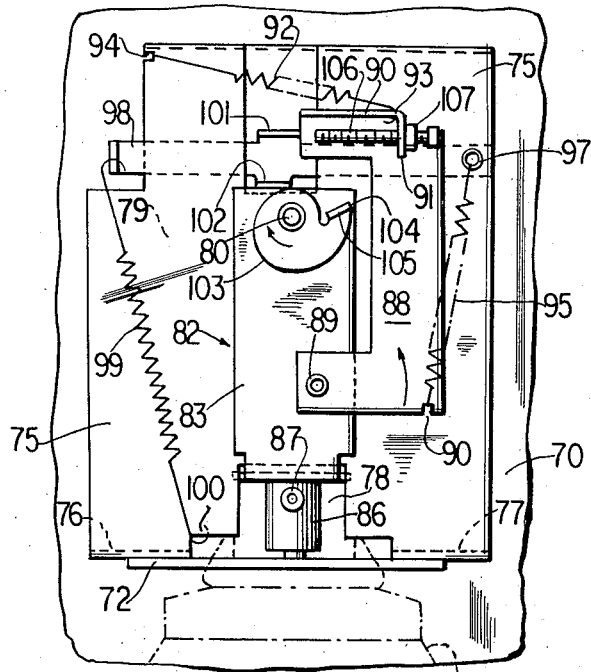
FIG. 11
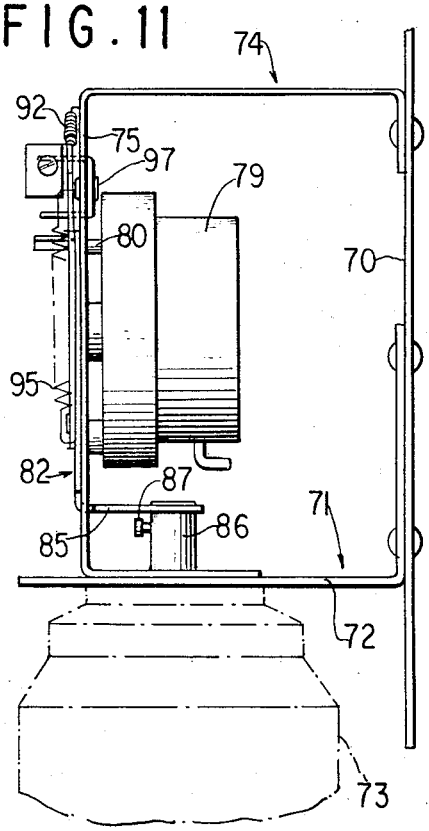
FIG. 12
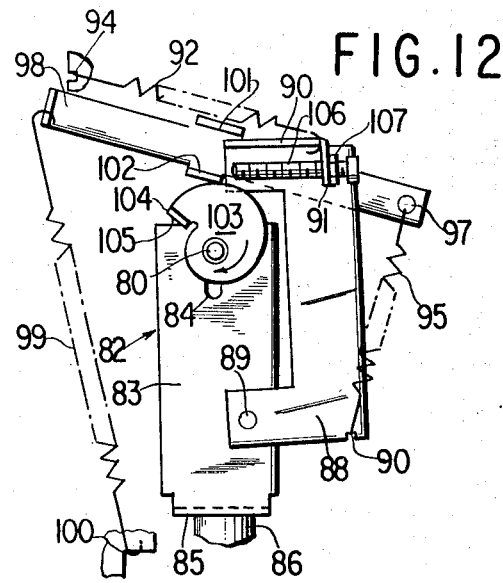
INVENTOR.
ROBERT L. WEBER III
BY
ATTORNEYS Feb. 13, 1968 R. L. WEBER III 3,368,717
DISPENSER
Filed Oct. 24, 1965 13 Sheets-Sheet 6

INVENTOR.
ROBERT L. WEBER III
BY
ATTORNEYS

Feb. 13, 1968    R. L. WEBER III    3,368,717
DISPENSER
Filed Oct. 24, 1965    13 Sheets-Sheet 9
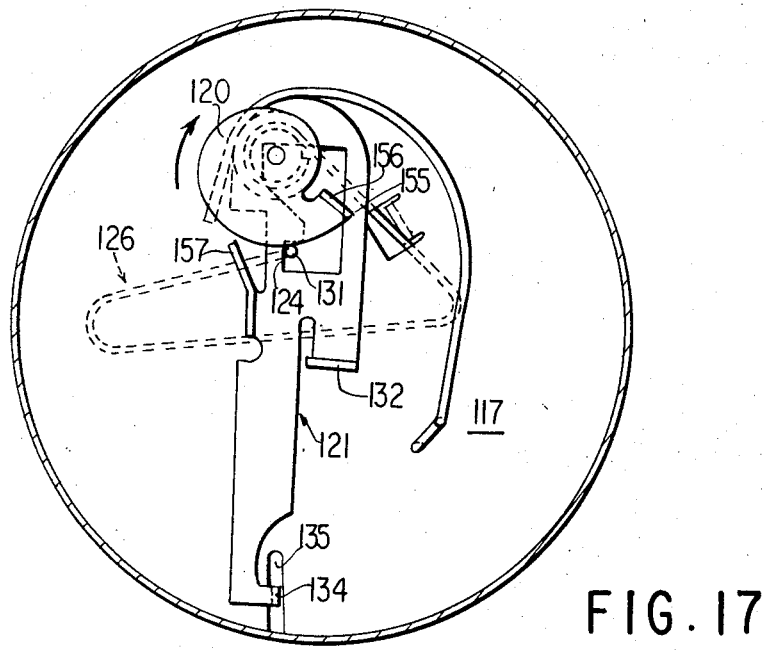
FIG. 17
FIG. 18
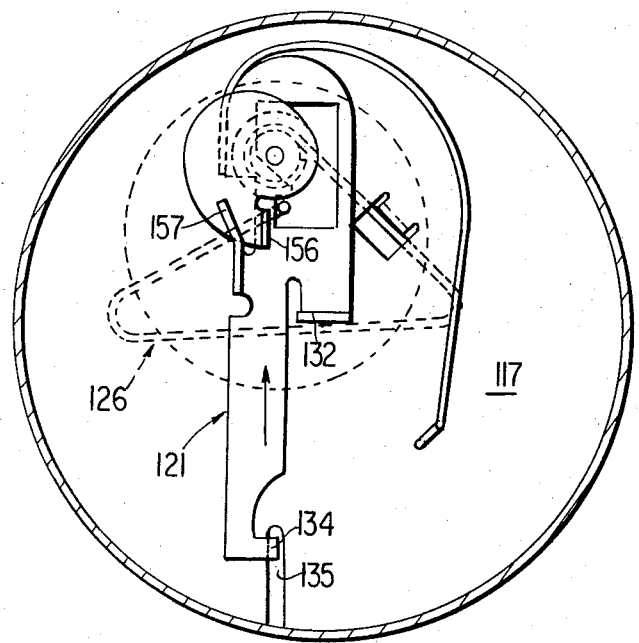
INVENTOR
ROBERT L WEBER
BY
ATTORNEYS

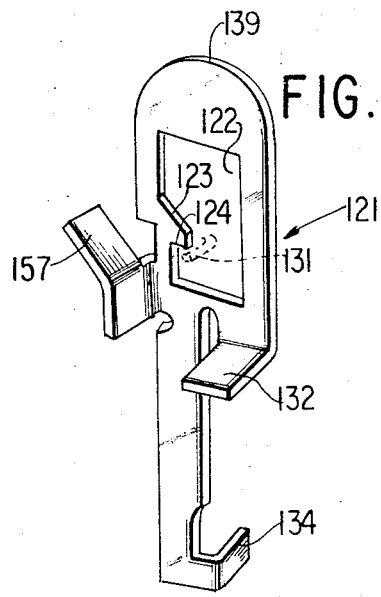
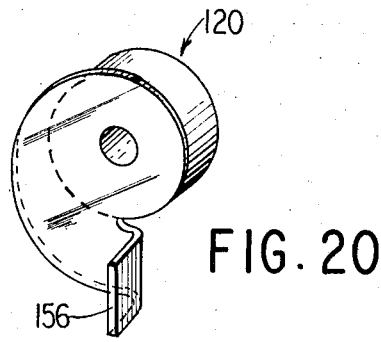
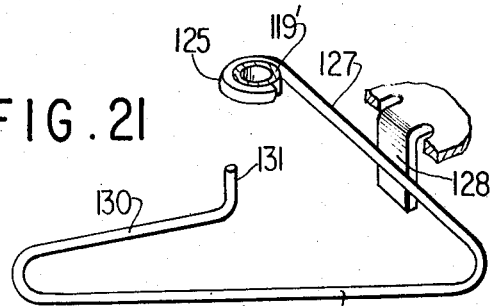
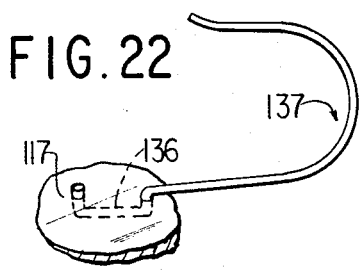
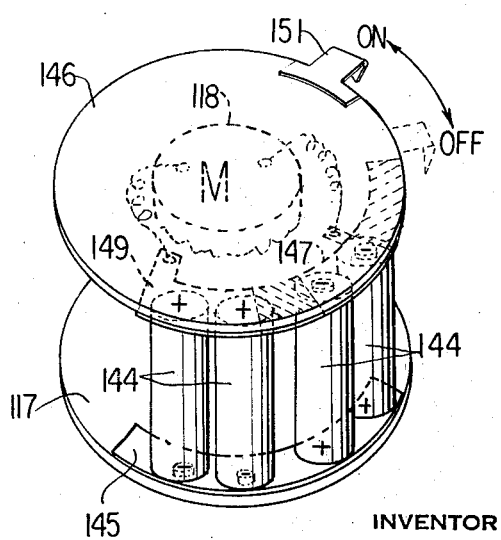

Feb. 13, 1968 R. L. WEBER III 3,368,717
DISPENSER
Filed Oct. 24, 1965 13 Sheets-Sheet 11
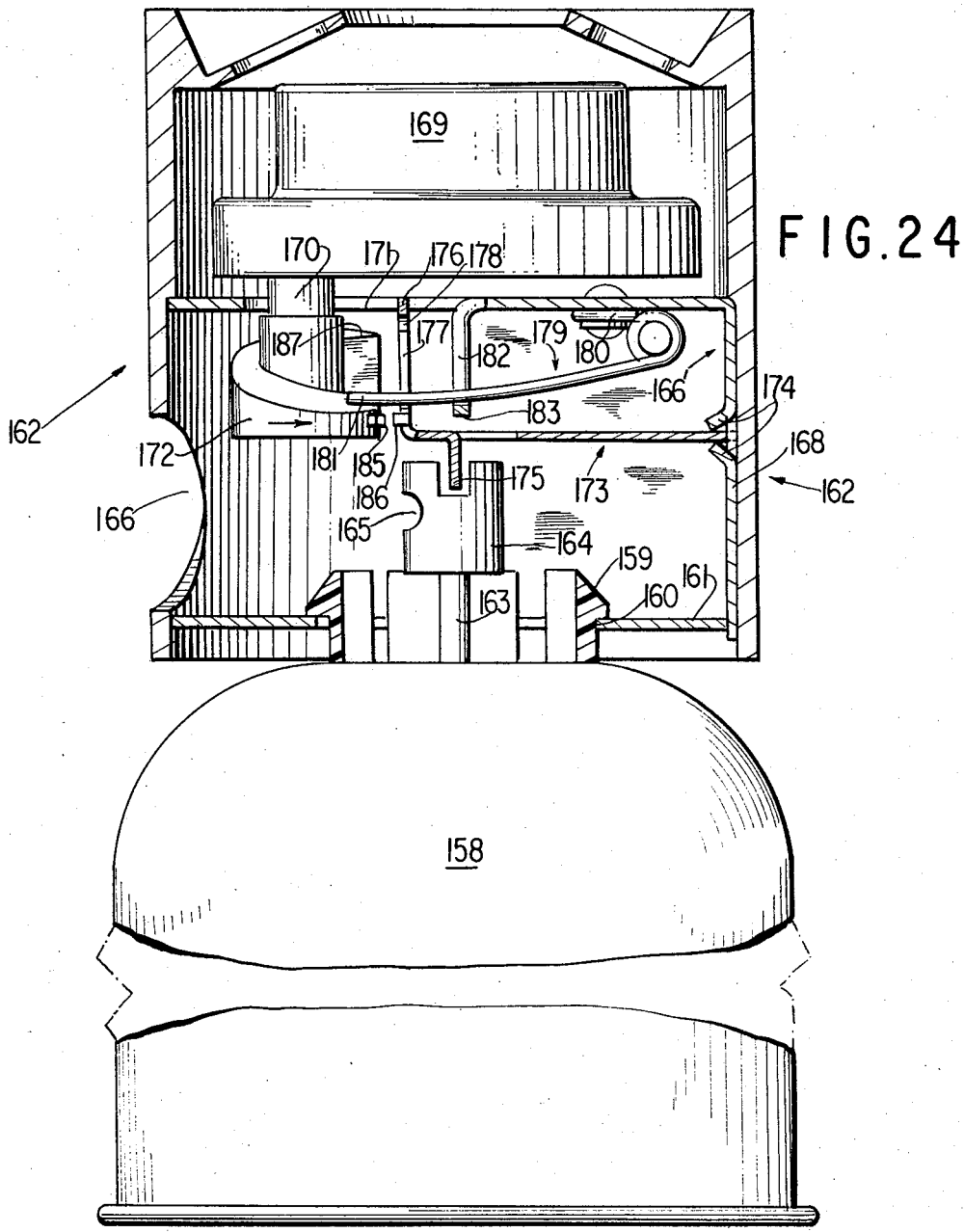
FIG.24
INVENTOR.
ROBERT L. WEBER III
BY
ATTORNEYS

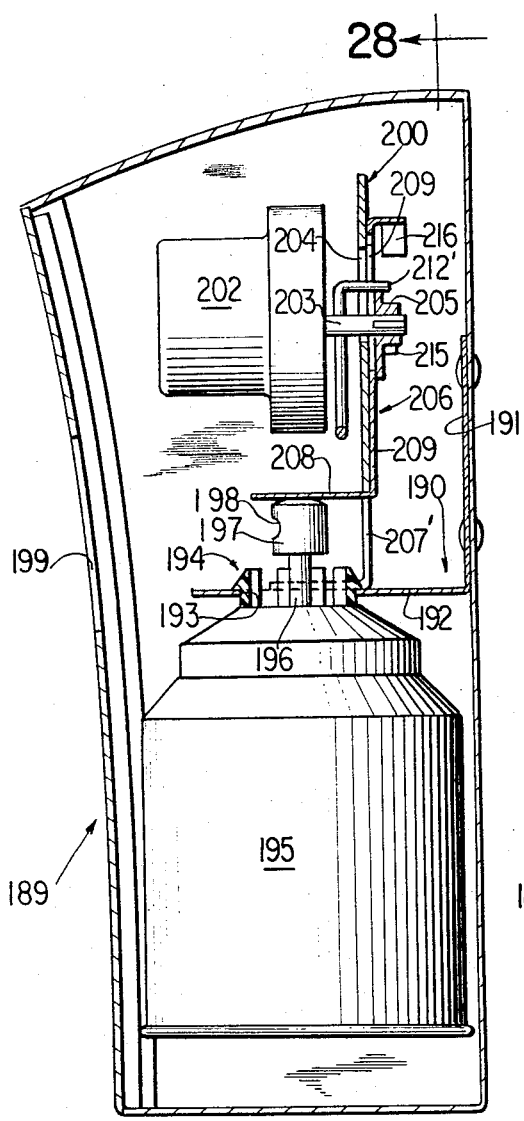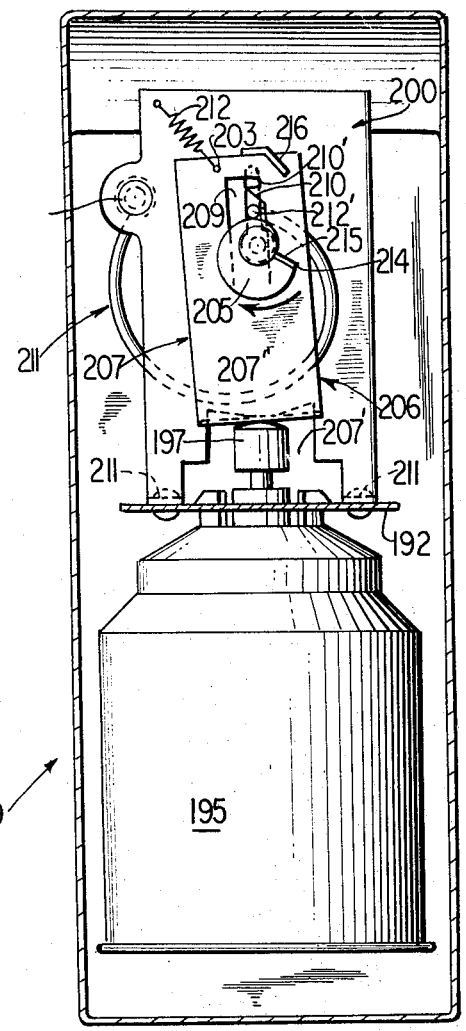
FIG. 27
FIG. 28
INVENTOR.
ROBERT L. WEBER III

Feb. 13, 1968  R. L. WEBER III  3,368,717
DISPENSER
Filed Oct. 24, 1965  13 Sheets-Sheet 13
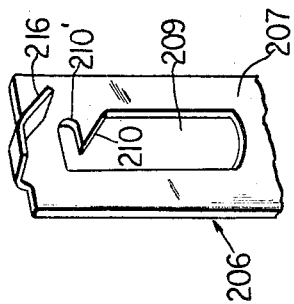
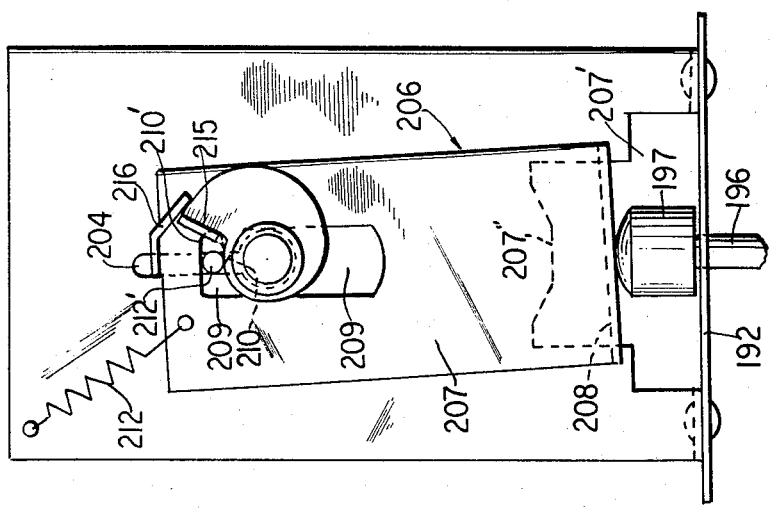
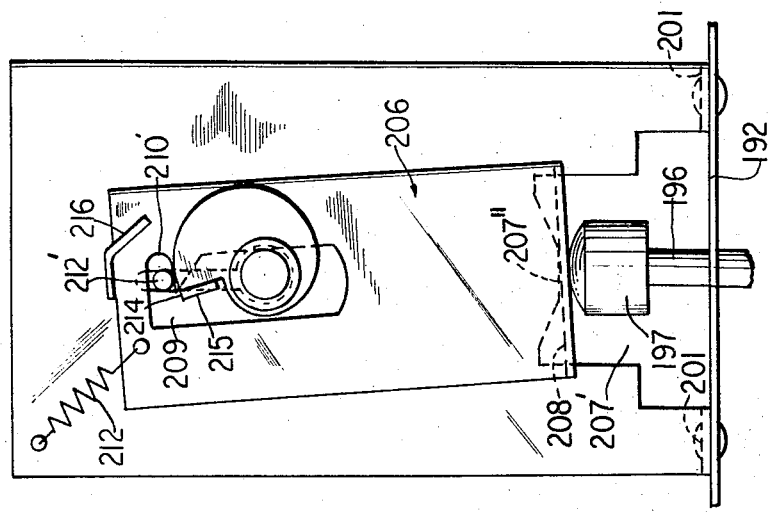
INVENTOR.
ROBERT L. WEBER III
BY
ATTORNEYS

United States Patent Office 3,368,717
Patented Feb. 13, 1968

3,368,717
DISPENSER
Robert L. Weber III, New Canaan, Conn., assignor to Time-Mist Inc., Stamford Conn., a corporation of Delaware
Filed Oct. 24, 1965, Ser. No. 504,544
17 Claims. (Cl. 222—70)

ABSTRACT OF THE DISCLOSURE

A dispensing apparatus including timing motor means, support means for holding an aerosol container, energy storing and energy release mechanisms cooperating with said timing motor and said aerosol container for periodically actuating the valve of the container to dispense a spray therefrom at predetermined intervals of time.

---

This invention relates to spray dispensers and particularly to an improved spray dispenser that has the capability of automatically dispensing a spray at periodic intervals.

Spray dispensers are old, and they contain many and varied materials among which are germicidals, deodorants, insecticides, decongestants, as well as perfumes and other substances, the odors of which cause definite reactions on the person who smells them. Some such materials are employed even in theaters in order to create various impressions on the audience during performances.

Many of these sprays are satisfactorily dispensed by the manual actuation of the dispensing valve on the containers of the material. However, it is often desirable automatically to effect a spray dispensing operation for a predetermined duration, at predetermined intervals of time.

The principal object of the present invention is to provide apparatus for holding an aerosol can and for periodically actuating its valve to dispense a spray for a predetermined time interval.

Another object of the invention is to provide such an apparatus in which a timer control effects a cycle of operations including depressing the valve of an aerosol container for a predetermined duration.

Still another object of the invention is to provide such an apparatus in which a rotatable cam is employed to sequentially cock a spring-actuated sear plate to effect operation of the valve in the aerosol can and subsequently render the sear plate ineffective.

In one aspect of the invention, a main plate may include means for attaching it to a wall or other suitable supporting means. The main plate may have fixed to it a bracket, one portion of which extends at right angles from the main plate, said portion being provided with an opening at its end farthest from the main plate, adapted to receive a connector that cooperates with the top of an aerosol can in a manner to provide a support for the can so that the can may be easily removed from the bracket.

In another aspect of the invention, a secondary plate may be attached to said bracket in spaced, parallel relation to said main plate and it may support a timing motor on its back face between said secondary plate and said main plate.

In a further aspect of the invention, a strip may be mounted on the back of the secondary plate for sliding movement, and it may have its ends extending in the same direction from, and at right angles to, the body of the strip, said ends extending through openings in the secondary plate.

In a still further aspect of the invention, the lower end of the strip that extends through the secondary plate may include a cap that engages the valve of the aerosol can, said valve being normally urged upwardly by spring means within the valve, which action normally urges the strip to its upper position.

In another aspect of the invention, a sear strip may be mounted on the front face of the secondary plate for oscillatable motion and located in substantial alignment with the back face strip. The sear strip may be urged in a counterclockwise direction and in a downward direction by spring means. The upper end of the sear strip may include a cam edge adapted to cooperate with the upper end of the back face strip that extends through the secondary plate. It also may include a tab that cooperates with said upper end of the back face strip. Upon release of the sear strip, the tab acts to force the back face strip down when said tab overlies the upper end thereof, and the cam edge acts to effect said overlying relationship.

In a further aspect of the invention, the output shaft of the timing motor may extend through the secondary plate and support a spiral cam thereon in position to act on the tab on the sear strip.

The construction is such that as the cam rotates, it raises the sear strip, causing the cam edge thereon to force said sear strip clockwise until the tab thereon is above the top end of the back strip when spring means moves the sear strip counterclockwise so that the tab thereon overlies the tab at the upper end of the back face strip. Continued rotation of the spiral cam causes its high point to release the sear strip so it snaps downwardly, forcing the back strip to snap downwardly also. The lower end of the back face strip actuates the valve in the aerosol can to dispense a spray. This downward movement of the sear strip causes another tab on it to lie in front of a tab on the spiral cam so that continued clockwise motion of the cam moves the sear strip clockwise, releasing the upper end of the back strip, whereupon the latter is forced upwardly by the spring in the valve of the aerosol can. Continued clockwise motion of the spiral cam releases the sear strip so that its spring turns it counterclockwise, forcing the cam edge thereon into contact with the upper end of the back face strip. This sequence of events continues so long as the timing motor is energized.

In still another aspect of the invention, a single spring means may be employed to force the sear strip down as well as in a counterclockwise direction.

In yet another aspect of the invention, adjustable means may be provided for presetting the time interval during which the spray issues from the aerosol can.

In an additional aspect of the invention, a battery-operated timing motor may be employed that drives a spiral cam for storing up energy in a spring that cooperates with a sear strip or plate.

In a further aspect of the invention, a face cam (rather than an edge cam) may be utilized for storing energy in a leaf-type spring that coacts with a sear strip or plate.

In a still further aspect of the invention, a torsion spring may be used, the free end of which cooperates with cam means, one that is rotated by the timing motor and the other forming part of the sear plate or strip for acting on the dispensing valve of the aerosol can.

The above, other objects and novel features of the improved dispensing apparatus will become apparent from the following specification and accompanying drawings which are merely exemplary.

Figure 25:
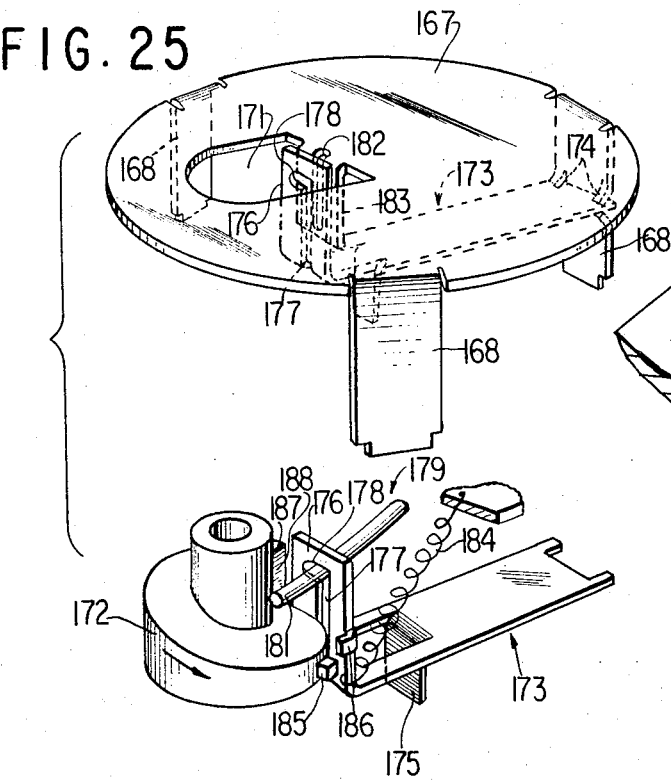
Figure 26:
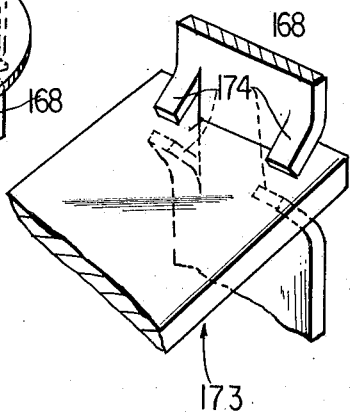
Figure 12A:
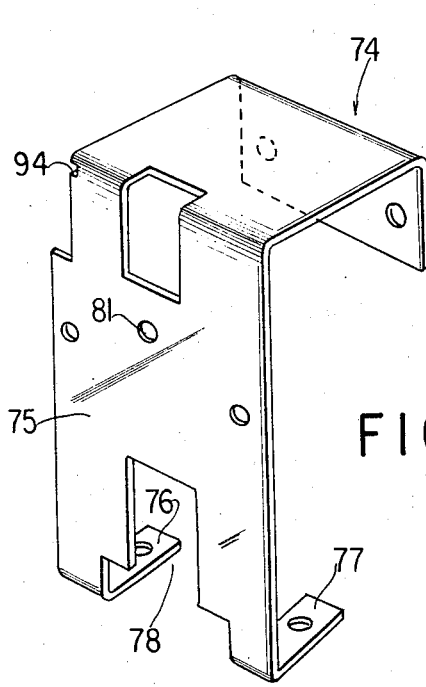
Figure 13:
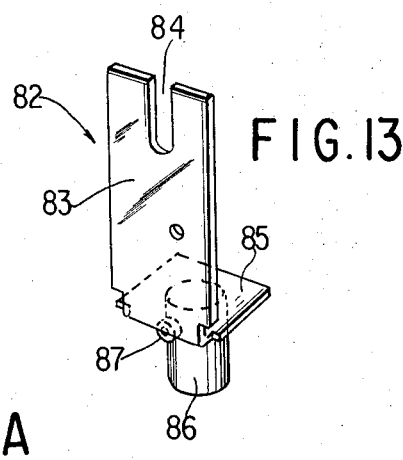

FIGS. 5 to 9, inclusive, are views generally similar to those of FIGS. 1–4, showing a modified form of the invention;

FIGS. 10 to 13, inclusive, are views showing still another modified form of the invention;

FIGS. 14 to 23, inclusive, are views generally similar to those of FIGS. 1–4, showing another modified form of the invention;

FIGS. 24 to 26, inclusive, are views generally similar to those of FIGS. 1–4, showing still another modified form of the invention; and FIGS. 27 to 31, inclusive, are views generally similar to FIGS. 1–4, showing yet another modified form of the invention.

Referring to the drawings, and particularly to FIGS. 1 to 4, inclusive, the principles of the invention are shown as applied to a dispensing apparatus including a main plate 25 having key-shaped openings 26 for mounting plate 25 onto a wall or other suitable supporting means.

Figure 1:
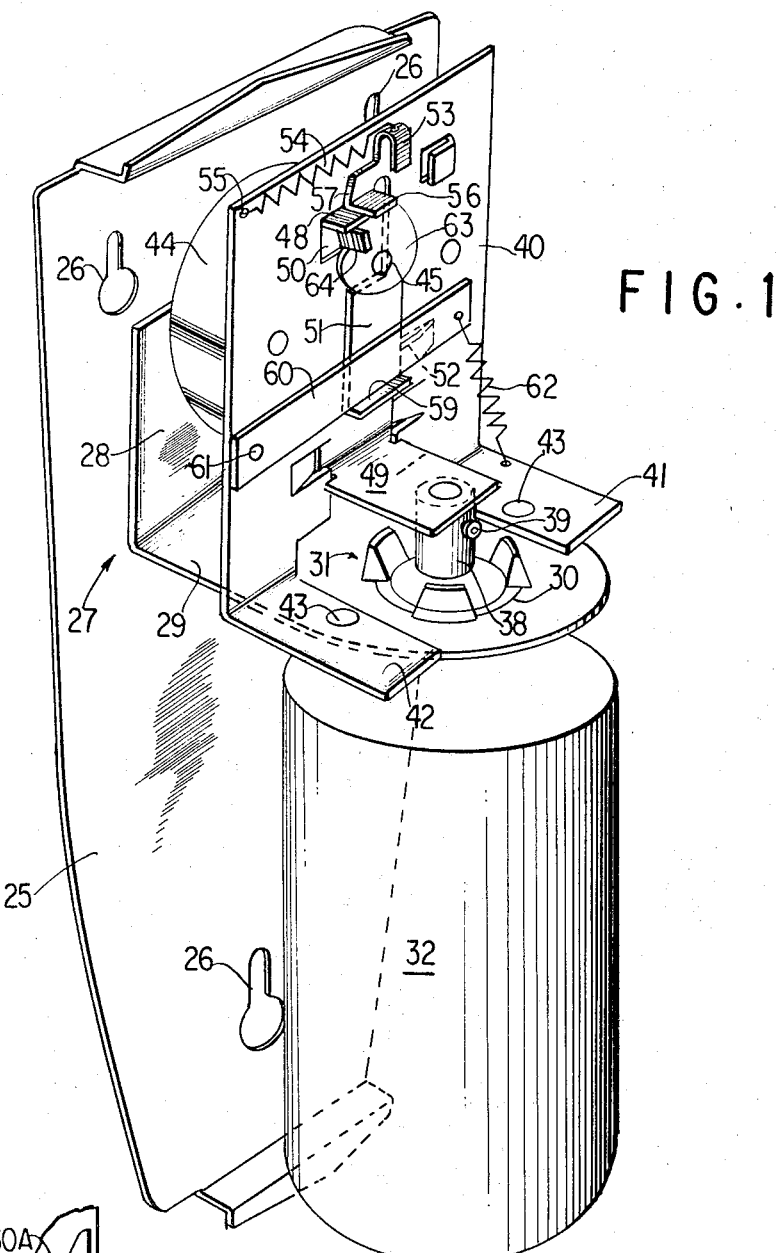
FIG. 1 is a perspective view of a dispensing apparatus to which the principles of the invention have been applied.

An L-shaped bracket 27 may have its one leg 28 fixed to main plate 25, and its other leg 29 may extend outwardly from main plate 25. The outer end of leg 29 may include a hole 30 adapted to receive a resilient connector 31 which itself is attached to the top of an aerosol can 32. The can 32 may include a valve that is covered by a cap 38 (FIG. 1). The valve is spring pressed upwardly, and when depressed causes a spray to be dispensed through an aperture 39 in cap 38.

A secondary plate 40 having spaced legs 41, 42 at right angles to plate 40 may be attached to leg 29 of bracket 27 by rivets 43. A timing motor 44, which may be electric or spring-wound, may be attached to the back of plate 40, and its output shaft 45 may extend through a hole in the plate 40.

A strip 46 (FIG. 2) may be mounted on the back face of plate 40 for reciprocable motion. It is held in place by tabs 47 struck out from plate 40. The ends 48 and 49 of strip 46 are formed at right angles to, and extend in the same direction from, the body of strip 46. Ends 48, 49 extend through openings in plate 40 to points beyond the front face thereof. The hole 50 through which end 48 extends is elongated, and the end 49 lies between legs 41, 42 so that strip 46 is permitted limited reciprocable movement.

The end 49 of strip 46 is adjacent to the valve cap 38 of the aerosol can 32, so that when strip 46 is moved downwardly, the valve in the can is depressed, dispensing a spray from nozzle 39. Normally, however, the spring in the valve beneath cap 38 forces strip 46 to its upper extremity with end 48 against the upper end of opening 50.

In order to force strip 46 downwardly, a sear plate 51 is mounted in the front face of plate 40, substantially transversely aligned with strip 46. The sear plate 51 is guided between a tab 52 and the shaft 45 of motor 44 (FIG. 4), which arrangement permits limited oscillatable as well as reciprocable movement.

The sear plate 51 includes a hook portion 53 that is connected to one end of a spring 54, the opposite end of which spring is anchored on plate 40 at 55. The sear plate 51 also includes a tab 56 having an inclined cam edge 57 that cooperates with the edge 58 of the end 48 of plate 46, as will be explained later.

The lower end of sear plate 51 includes a ledge 59 across which a lever 60 extends. One end of lever 60 is pivoted at 61 to plate 40, and the opposite end is connected to a spring 62, which latter is anchored on plate 40.

Figure 1A:
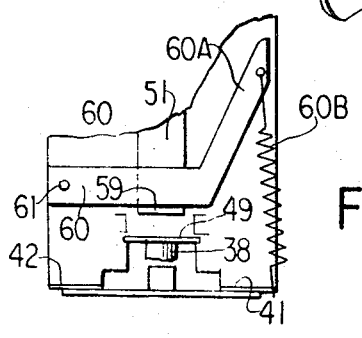
FIG. 1A is a view of a modified form of an element shown in FIG. 1.
Figure 2:
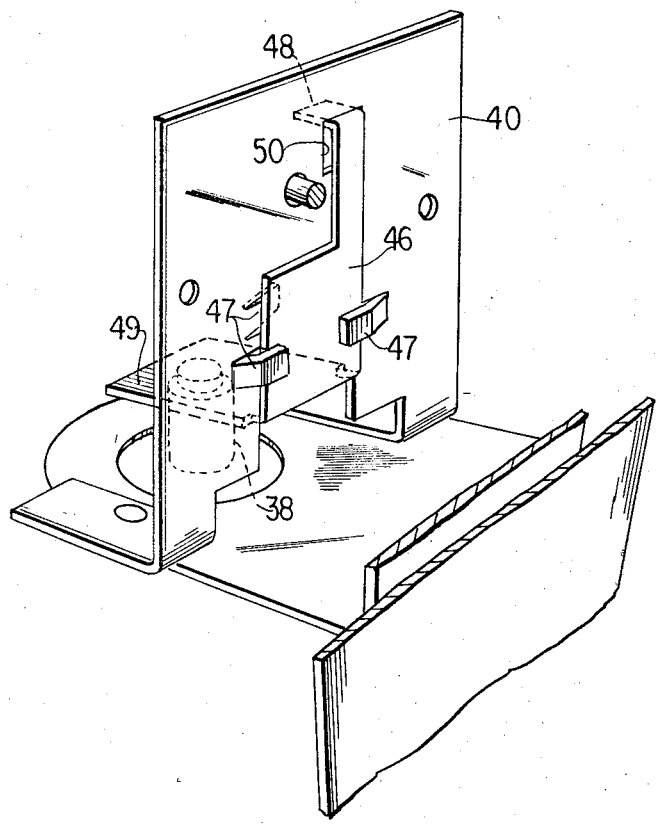
FIG. 2 is a perspective view of the back face strip mounted for reciprocable movement on the motor supporting plate.

Referring to FIG. 1A, the lever 60, opposite pivot point 61, includes an angularly disposed arm 60A that extends diagonally upwardly. A spring 60B has one of its ends connected to the free end of arm 60A and the other end anchored to leg 41.

Figure 3:
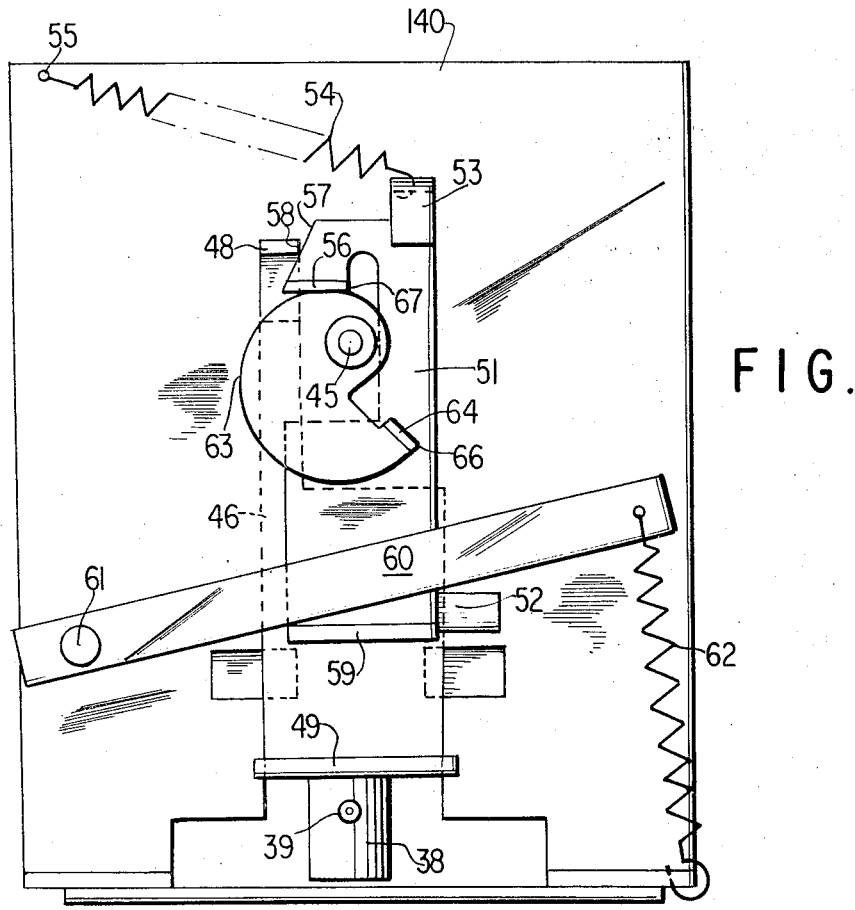
FIG. 3 is an enlarged front elevational view of a portion of the apparatus shown in FIG. 1.
Figure 4:
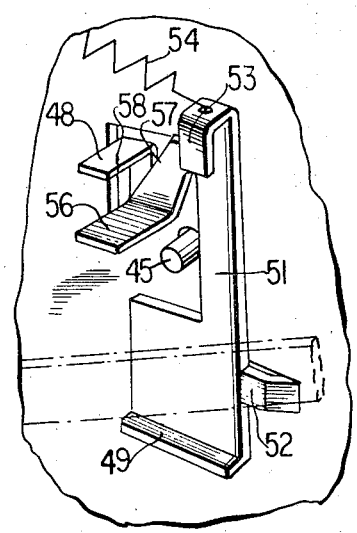
FIG. 4 is a perspective view of the sear strip mounted on the front face of the motor supporting plate.
Figure 5:
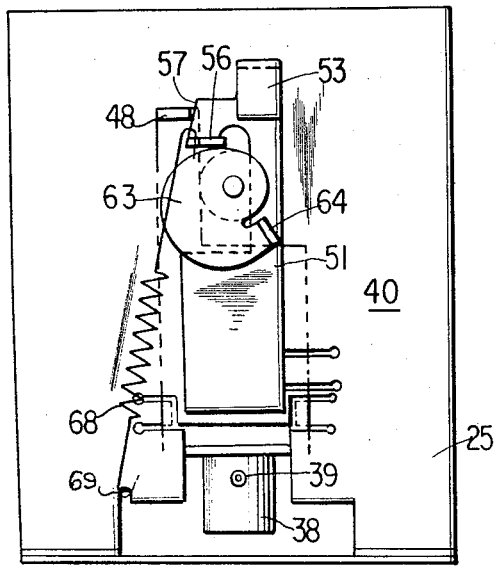
Figure 7:
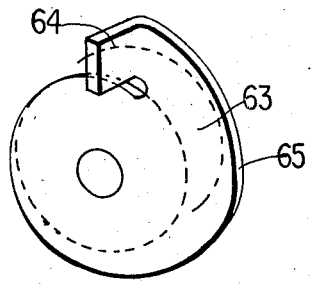
Figure 8:
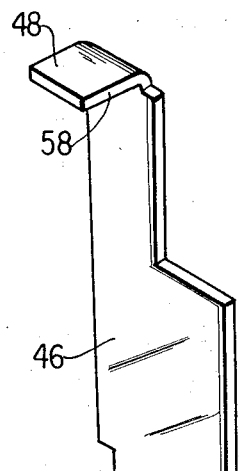
Figure 6:
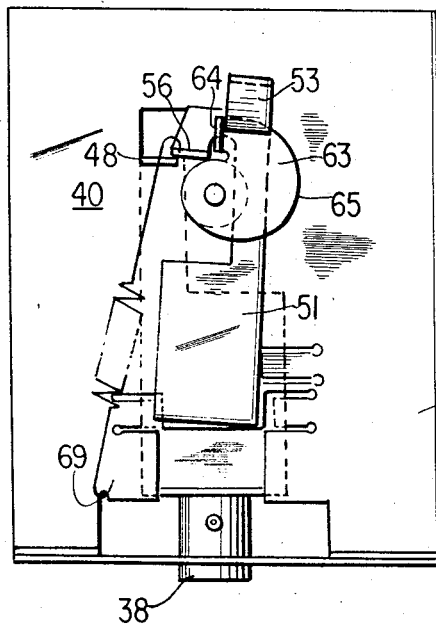
Figure 9:
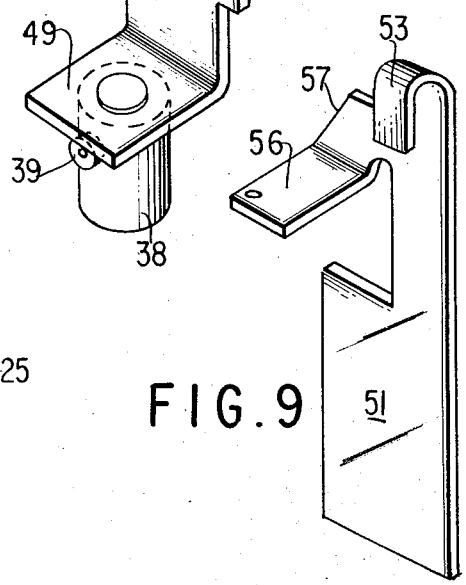

A spiral cam 63 is fixed to shaft 45 of motor 44. It has a tab 64 at its highest point for a purpose to be described. Referring to FIG. 3, plate 46 is shown at its uppermost position, forced there by the spring in valve 38. As cam 63 rotates clockwise, its edge 65 acts on tab 56 of sear plate 51, forcing it upwardly against the action of spring 62. The edge cam 57 acts on the edge 58 of end 48, forcing sear plate 51 rightwardly against the action of spring 54 while plate 51 moves upwardly so that when the lower edge of tab 56 is above the upper surface of end 48, spring 54 moves sear plate 51 leftwardly, and the tab 56 then moves into overlying position relative to end 48.

Continued clockwise movement of cam 63 occurs until the point 66 thereon passes point 67 on tab 56, whereupon spring 62 snaps sear plate 51 downwardly, and with it plate 46, so that end 49 depresses valve cap 38 to dispense a spray from nozzle 39. When this occurs, tab 64 lies between edge 67 of tab 56 and hook 53 of sear plate 51. Continued clockwise rotation of cam 63 causes tab 64 to act on hook 53, forcing sear plate 51 rightwardly. This releases end 48 of plate 46, and the spring in the valve beneath cap 38 returns it to its upper position shown in FIG. 3. When tab 64 passes beyond hook 53, spring 54 returns sear plate 51 leftwardly to the position shown in FIG. 3, with cam edge 57 against the edge 58 of end 48 of plate 46.

As long as the motor 44 is energized, the above cycle is repeated, causing periodic dispensing of a spray from can 32 through nozzle 39.

Referring to FIGS. 5 to 9, inclusive, the principles of the invention are shown as applied to a modified form of the invention. The parts will have the same numerical designation as like parts in FIGS. 1 to 4. In this modified form of the invention, the ledge 59 on the sear plate 51 is eliminated as is lever 60. A spring 68 is connected to the tab 56 on the sear plate 51, and the opposite end of spring 68 is anchored at 69 to the plate 40. Otherwise this embodiment is the same and functions in the same manner as the embodiment of FIGS. 1 to 4.

Referring to FIGS. 10 to 13, inclusive, the principles of the invention are shown as applied to still another embodiment of the invention. Referring to FIGS. 10 and 11, a plate 70, adapted to be attached to a support such as a wall, has fixed to it an L-shaped bracket 71 including one leg 72 extending outwardly from plate 71 which supports an aerosol can 73 in the same way that the can in FIG. 1 is supported. Another bracket 74 is mounted on plate 70 and it includes a plate 75 that is parallel with and spaced from plate 70. Referring to FIG. 12A, the bracket 74 includes spaced legs 76 and 77 on each side of a cut-out portion 78, which legs are attached to leg 72 of bracket 71.

A synchronous motor 79 is mounted on the back of plate 75 and includes an output shaft 80 that extends through a hole 81 (FIG. 12A) of plate 75. An L-shaped member 82 (FIG. 13) includes a leg 83 having a slot 84, the side walls of which receive the output shaft 80, which latter guides the leg 83 of member 82 for reciprocable movement along the front face of plate 75. The lower end of member 82 includes a right angular portion 85 to which is connected a cap 86 having a transverse nozzle 87 therein. Cap 86 fits over the valve of the aerosol can and when moved downwardly, causes the dispensing of the material in can 73 through nozzle 87.

Referring to FIGS. 10 and 12, a sear plate 88 is pivotally mounted on the reciprocable member 82 by a pin 89. Plate 88 may comprise a C-shaped element, the top leg of which includes tabs 90 and 91 at right angles to each other and extending in the same direction from, and at right angles to, the sear plate 88. Sear plate 88 is normally urged in a counterclockwise direction about pin 89 by a spring 92 that has one of its ends connected to sear plate 88 at point 93 and its other end anchored to plate 75 at 94. An additional spring 95 may be connected to the sear plate 88 at point 96, its other end being anchored to plate 75 at point 97.

A lever 98 may also be pivoted to plate 75 at point 97, and a spring 99 may have one of its ends connected to the end of lever 98 opposite pivot 97, and the other end of spring 99 may be anchored to plate 75 at point 100. The lever 98 may include parallel spaced tabs 101, 102 extending in the same direction from the center of lever 98.

A cam 103 is fixed to the output shaft of motor 79 and rotates in a clockwise direction. Its surface is in the form of a spiral that acts on the tab 102 to cause movement of lever 98 in a clockwise direction against the action of spring 99. As lever 98 moves in this clockwise direction, there will be a point in its movement where the righthand end of tab 101 will move upwardly beyond the lefthand edge of tab 90, at which time the sear plate 88 pivots counterclockwise under the force of springs 92 and 95, locating tab 90 beneath tab 101.

Continued clockwise movement of cam 103 causes its end point 104 to move beyond the righthand end of tab 102, whereupon spring 99 snaps lever 98 counterclockwise about pivot 97, forcing sear 88 and with it plate 82 downwardly, thus actuating the valve in the aerosol can 73 to dispense a spray through nozzle 87. When this occurs, a tab 105 on cam 103 passes between the righthand end of tab 102 and the lefthand end of a screw 106 that is threaded into a threaded hole in tab 91 on sear plate 82. A nut 107 on screw 106 serves to lock it in adjusted position.

Continued clockwise movement of cam 103 moves sear plate 88 clockwise about pivot 89 until the lefthand end of tab 90 on sear plate 88 clears the righthand end of tab 101 on lever 98. This permits springs 92 and 95 to raise sear plate 88 and turn it counterclockwise, and in so doing, cuts off the spray from nozzle 87. In this embodiment, the adjusted position of the screw 106 determines, with the rate of rotation of cam 103, the duration of the spray emitted from nozzle 87. As long as the motor 79 is energized, the above cycle repeats.

Referring to FIGS. 14 to 23, inclusive, the principles of the invention are shown as applied to a battery-operated dispensing apparatus in which the valve in the aerosol can 108 is transversely operated rather than longitudinally operated.

Figure 14:
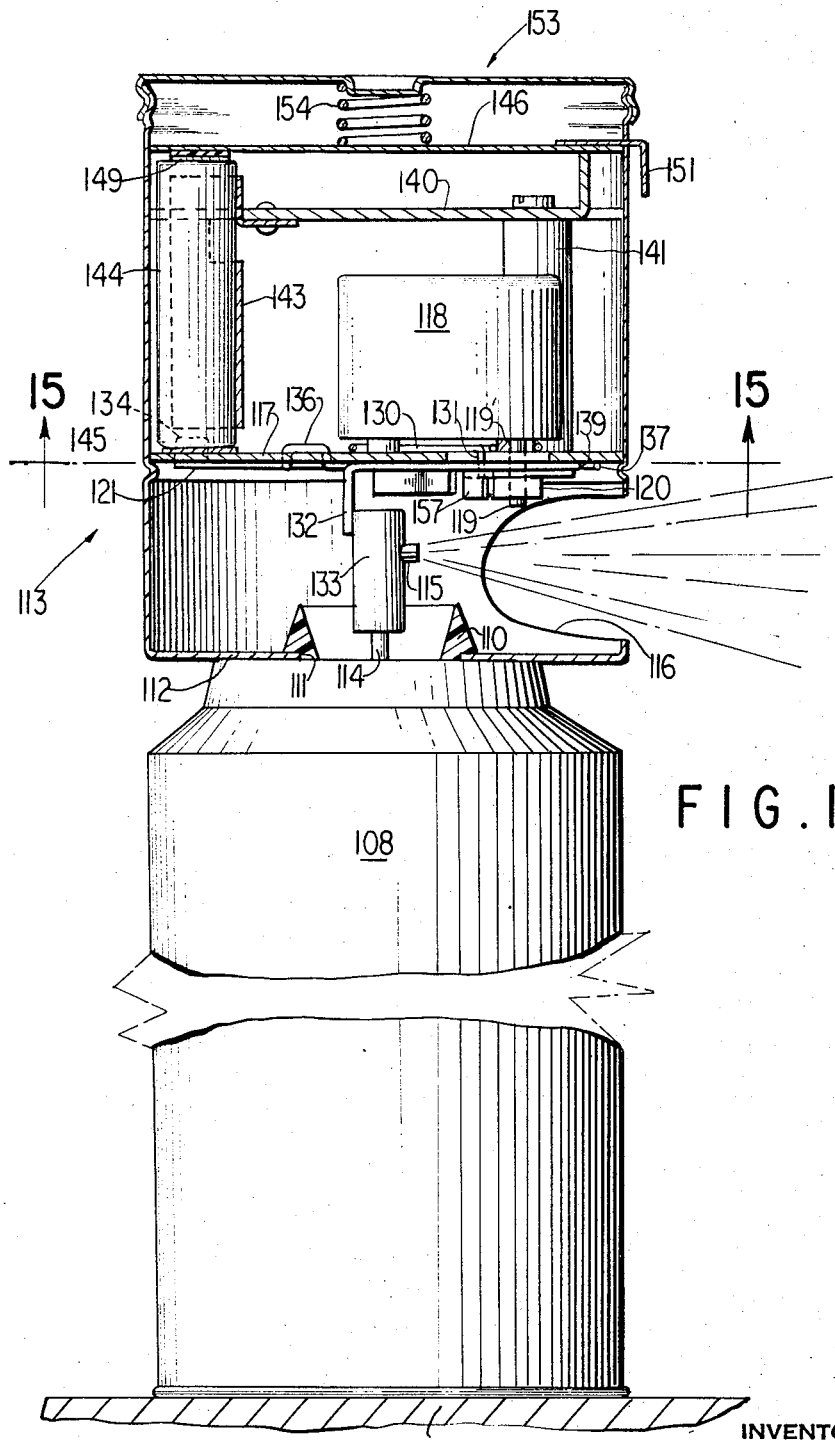

Referring to FIG. 14, an aerosol can 108 is adapted to be supported on a horizontal platform 109. The can 108 includes a resilient connector 110 that passes through a hole 111 in a bottom plate 112 of a frame 113. Can 108 may include a dispensing valve having a stem 114 which, when pivoted clockwise (FIG. 14), causes a spray to be dispensed through a nozzle 115.

The frame 113 comprises a hollow cylindrical housing having a cut-out portion 116 through which the spray from nozzle 115 passes. A partition plate 117, parallel with bottom plate 112, may support a timing motor 118, the output shaft 119 of which extends through a boss 119' on the top face of partition 117. Shaft 119 has a spiral cam 120 fixed to it for a purpose to be described later.

Figure 15:
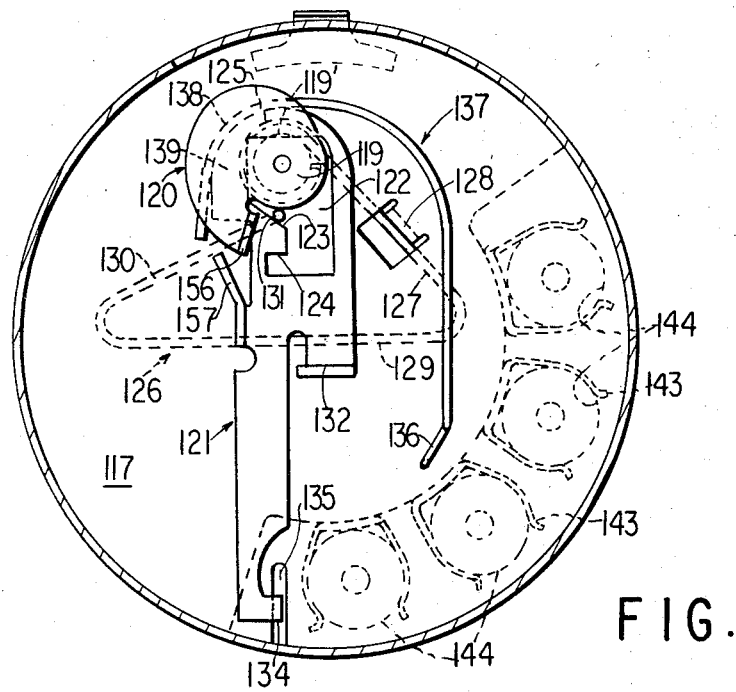

A sear plate 121 is mounted for sliding movement along the underface of partition 117. Referring to FIGS. 15 and 19, sear plate 121 may comprise a rectangular opening 122 therethrough having a cam surface 123 and a latch means 124. Shaft 119 may extend through opening 122 and cam 120 may be located in a manner overlying sear plate 121.

The one end 125 of a spring 126 may be anchored on boss 119', and spring 126 may be generally triangular in form including a leg 127 that engages a tab 128, another leg 129 and a third leg 130. Legs 127, 129 and 130 are in one plane lying on the top face of partition 117. The end 131 of leg 130 is at right angles to, and extends through an aperture in partition 117 sufficiently large to permit its movement within the opening 122 in sear plate 121 and long enough to ride on the edge of spiral cam 120.

The sear plate 121 may include a tab 132 that cooperates with the head 133 on stem 114 that includes spray nozzle 115. The normal spring action in the valve of can 108 tends to retain stem 114 vertical and hence tends to move sear plate 121 leftwardly (FIG. 14). Plate 121 also includes a tab 134 that extends through a slot 135 in partition 117 to guide and limit the movement of sear plate 121.

Figure 16:
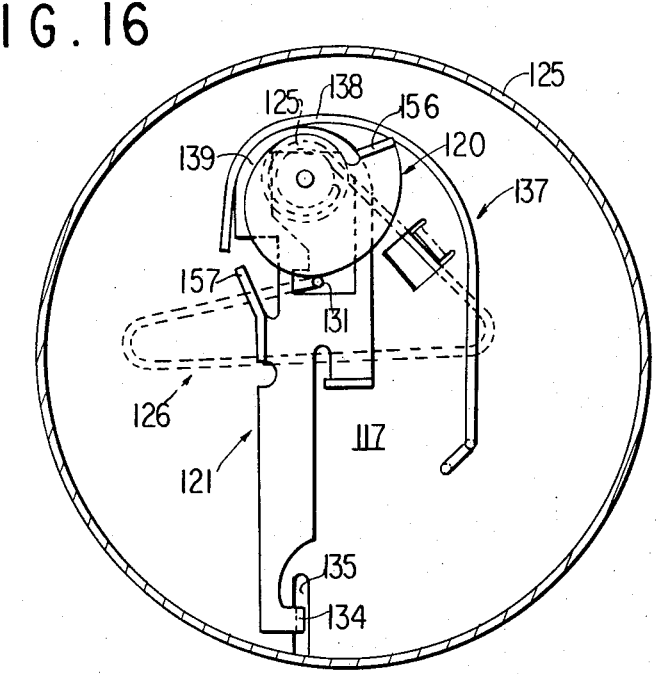

One end 136 of another spring 137 is anchored in partition 117 and extends along the underface thereof. Referring to FIGS. 15 and 16, the opposite end 138 extends partially around the top 139 of sear plate 121 and normally urges it rightwardly (FIGS. 15–18) against the force of the end 131 of spring 126 acting on cam surface 123 of sear plate 121, said end 131 also resting on the edge of cam 120.

Referring again to FIGS. 14, 15 and 23, the hollow frame 113 may include a partition 140 parallel with partition 117 and located above it by a spacer 141. The partitions 140 and 117 may include clip means 142 and 143 in aligned relation adapted to receive and support batteries 44. Partition 117 may include a conducting strip 145 on which the one ends of batteries 144 rest.

An insulating plate 146 is located over the top of the batteries 144. It may include a contact strip 147 that is connected to one terminal of motor 118, the opposite terminal of which is connected to another contact strip 149 that also contacts the positive ends of two of the batteries 144. Another contact strip 147 on plate 146 may contact the negative ends of the other two batteries 144. Finger 151 extends through a slot 152 (FIG. 14) of frame 113 for turning plate 146.

A cap 153 may be threaded onto the top of frame 113, and a spring 154 may urge plate 146 downwardly to make proper connection with the various electrical contacts. The construction is such that movement of contact 150 counterclockwise (FIG. 23) energizes motor 118, and in the position shown, de-energizes said motor.

With the parts in the condition shown in FIG. 15, energization of motor 118 causes cam 120 to rotate clockwise forcing the end 131 of spring 126 outwardly along cam 123, spring 137 urging sear plate 121 rightwardly, and the end 131 of spring 126 and cam 123 restraining its rightward movement. When the end 131 of spring 126 is in the position shown in FIG. 16, the end 138 of spring 137 moves sear plate 121 to the position shown in FIG. 17 where the end 131 of spring 126 is located in notch 124 of sear plate 121.

Continued clockwise movement of cam 120 stresses spring 126 until the end 155 thereof passes beyond end 131 of spring 126. This causes sear plate 121 to be snapped radially to the position shown in FIG. 26, causing tab 132 (FIG. 14) to pivot head 133, thereby causing a spray to issue from nozzle 115.

Continued clockwise movement of cam 120 causes a tab 156 thereon to engage a tab 157, forcing sear plate 121 leftwardly (FIG. 17) to remove end 131 of spring 126 from notch 124. The spring action in the valve of the can 108 then returns the stem 114 to a vertical position and with it, head 133, which of course returns sear plate 121 to the position shown in FIG. 15 with the end 131 of spring 126 resting on cam surface 123.

The foregoing cycle of operation repeats as long as motor 118 is energized.

Referring to FIGS. 24 to 26, inclusive, the principles of the invention are shown as applied to dispensing apparatus adapted to be supported by an aerosol can 158. A connector 159 attached to the top of can 158 may extend through a hole 160 in a bottom plate 161 of a hollow, cylindrical frame 162. Can 158 may include a valve stem 163 to which a cap 164 is connected, the latter having a nozzle 165 from which a spray is dispensed upon forcing the stem 163 vertically downwardly.

The frame 162 may include a cut-out portion 166 through which the spray from nozzle 165 passes. It also may include a bracket 166' having a top wall 167 and side legs 168. Top wall 167 may support a timing motor 169, the output shaft 170 of which extends through a hole 171 in wall 167 and supports a spiral face cam 172.

A sear plate 173 may be pivotally mounted between tab means 174 struck from one of the legs 168. Plate 173 is mounted for limited movement in a direction perpendicular to the plane of the paper in FIG. 24 for a purpose to be described later. The sear plate 173 may include a tab 175 that contacts the cap in which nozzle 165 is located. It also comprises an upstanding portion 176. Referring to FIG. 25, the portion 176 includes a slot 177 at the top of which a right angular slot 178 extends for a purpose to be described later.

Referring to FIG. 24, a spring 179 has one of its ends 180 anchored to plate 167 and its other end 181 extending through a slot 182 in a tab 183 struck downwardly from plate 167, for limiting the downward movement of end 181. End 181 of spring 179 also extends through slot 177 in portion 176 of sear plate 173 and rests on the face cam 172. The spring in the valve of the can 158 normally urges the sear plate 173 upwardly to the position shown in FIG. 24, and a spring 184 (FIG. 25) may act on plate 173, urging it counterclockwise looking downwardly in FIG. 25.

With the parts in the condition shown in FIG. 24, energization of motor 169 will rotate cam 172 in the direction of the arrow. This raises spring end 181 until it is at an elevation of slot 178, when spring 184 acts to move it in the direction of the arrow (FIG. 25) so that the end 181 of spring 179 moves into notch 178. Continued rotation of cam 172 causes the point 187 of cam 172 to pass beyond the end 181 of spring 179, permitting it to snap downwardly, forcing sear plate 173 downwardly also, so that tab 175 thereof depresses stem 163 of can 158, causing a spray to issue from nozzle 165 outwardly through cut-out portion 166.

Continued rotation of cam 172 causes the dog 185 to act on dog 186 to move plate 173 clockwise, thus moving end 181 out of slot 178, whereupon the spring in the valve of can 158 returns sear plate 173 to the position shown in FIG. 24.

As long as motor 169 is energized, the above cycle is repeated.

Referring to FIGS. 27 to 31, inclusive, the principles of the invention have been shown as applied to a dispenser including a housing 189 having a bracket 190 with a back leg 191 attached to the back wall of housing 189. A horizontal leg 192 of bracket 190 may include a hole 193 therein for receiving a resilient connector 194 attached to the top of an aerosol can 195. Valve stem of can 195 may include a head 197 having a nozzle 198 through which a spray may issue when stem 196 and head 197 are depressed. The housing 189 may include a cut-out portion 199 through which the spray passes.

A plate 200 having feet 201 may have the latter riveted to bracket leg 192. A timing motor 202 may be mounted within housing 189, the output shaft 203 of which may extend through an opening 204 in plate 200, and a spiral cam 205 may be keyed or otherwise fastened to shaft 203.

A sear plate 206 has a portion 207 extending along the back face of plate 200 and a portion 208 at right angles to portion 207 that extends through an opening 207' in plate 200 between feet 201. The top edge of opening 207' includes a pivot point 207" about which portion 208 pivots for a purpose to be described.

The portion 208 rests on top of head 197, and the spring in the valve of can 195 normally urges the sear plate 206 upwardly. Sear plate 206 includes an opening 209 of generally rectangular form having a cam surface 210 on its one side edge and a notch 210' at the top thereof. A coil spring 211 has its one end 212 anchored to plate 200 and its other end 212' bent at right angles to the coil plane and extending through passage 204, through rectangular opening 209, and resting on the edge of cam 205. A spring 212, having one of its ends anchored to plate 200, has its opposite end connected to sear plate 206 at point 213, urging plate 206 in a counterclockwise direction about pivot point 207".

With the parts in the condition shown in FIG. 28, rotation of cam 205 in the direction of the arrow upon energization of motor 202 causes the end 212' of spring 211 to move upwardly, acting on cam surface 210, thereby forcing sear plate 206 clockwise against the action of spring 212 until notch 210' receives the end 212' of spring 211. Further rotation of cam 205 causes its end 214 to pass beyond the end 212' of spring 211, thus causing it to snap sear plate 206 downwardly, and with it, head 197 which causes a spray to issue from nozzle 198. This action causes tab 215 to become located in front of a tab 216 on sear plate 206. Continued rotation of the cam 205 causes tab 215 to act on tab 216, forcing sear plate 206 clockwise about pivot point 207", withdrawing end 212' of spring 211 from notch 210', whereupon the spring in the valve of can 195 moves sear plate 206 to the position shown in FIG. 28.

As long as motor 202 is energized, the above cycle is repeated.

Although the various features of the improved dispensing apparatus have been shown and described in detail to fully disclose several embodiments of the invention, it will be evident that changes may be made in such details, and certain features may be used without others without departing from the principles of the invention.

What is claimed is:

1. In a dispensing apparatus for periodically acting to dispense a portion of the contents from an aerosol can having a valve means normally spring urged to a position preventing the dispensing of material within said can, the combination comprising means for supporting said can; a sear plate including a tab thereon; means for supporting said movable sear plate; a timing motor; means for supporting said timing motor; a cam connected to the output shaft of said timing motor; another plate interconnected with said apparatus and movable independently of, as well as with, said sear plate; cocking means cooperating with said sear plate; tab means on said another plate; and means on said sear plate responsive to the rotation of said cam for overlying and cooperating with said tab on said other plate for cocking said sear plate; means at the highest point on said cam for abruptly releasing said sear plate to cause it to actuate the valve in said can to dispense a portion of the contents of said can; and means on said cam for rendering said sear plate ineffective, whereby the valve in said can is shut to discontinue further dispensing of the conents of said can.

2. In a dispensing apparatus for periodically acting to dispense a portion of the contents from an aerosol can having a valve means normally spring urged to a position preventing the dispensing of material within said can, the combination comprising means for supporting said cam; a single sear plate which is slidable; means for supporting said movable sear plate; a timing motor and means for supporting said timing motor; a cam connected to the output shaft of said timing motor; another plate movable independently of, as well as with, said sear plate; tab means on said other plate; means on said sear plate responsive to the rotation of said cam for overlying said tab on said other plate; a pivotal lever adapted to engage a tab on said sear plate; a spring acting on said lever to force means on said sear plate into contact with said cam; means responsive to the rotation of said cam for storing energy in said spring and for cocking said sear plate;

means at the highest point on said cam for abruptly releasing said sear plate to cause it to actuate the valve in said can to dispense a portion of the contents of said can; and means on said cam for rendering said sear plate ineffective, whereby the valve in said can is shut to discontinue further dispensing of the contents of said can; resilient means for normally urging said sear plate into a cocked position; and cam means on said sear plate adapted to cooperate with said other plate to effect the cocking of said sear plate.

3. In a dispensing apparatus for periodically acting to dispense a portion of the contents from an aerosol can having a valve means normally spring urged to a position preventing the dispensing of material within said can, the combination comprising means for supporting said can; a single sear plate which is slidable; means for supporting said sear plate; a timing motor and means for supporting said timing motor; a cam connected to the output shaft of said timing motor; a spring; follower means responsive to the rotation of said cam for storing energy in said spring and for cocking said sear plate; means at the highest point on said cam for abruptly releasing said sear plate to cause it to actuate the valve in said can to dispense a portion of the contents of said can; and adjustable means on said sear plate adapted to cooperate with means on said cam for rendering said sear plate ineffective, whereby the valve in said can is shut to discontinue further dispensing of the contents of said can.

4. In a dispensing apparatus for periodically acting to dispense a portion of the contents from an aerosol can having a valve means normally spring urged to a position preventing the dispensing of material within said can, the combination comprising means for supporting said can; means for supporting a reciprocable plate having a cap adapted to engage the valve of said aerosol can; a single sear plate pivotally connected to said reciprocable plate; a timing motor and means for supporting said timing motor; a cam connected to the output shaft of said timing motor; a spring; follower means responsive to the rotation of said cam for storing energy in a spring and for cocking said sear plate; means at the highest point on said cam for abruptly releasing said sear plate to cause it to actuate the valve in said can to dispense a portion of the contents of said can; and adjustable means on said sear plate adapted to cooperate with means on said cam for rendering said sear plate ineffective, whereby the valve in said can is shut to discontinue further dispensing of the contents of said can.

5. In a dispensing apparatus for periodically acting to dispense a portion of the contents from an aerosol can having a valve means normally spring urged to a position preventing the dispensing of material within said can, the combination comprising means for supporting said can; means for supporting a reciprocable plate having a cap adapted to engage the valve of said aerosol can; a single sear plate pivotally connected to said reciprocable plate; a timing motor and means for supporting said timing motor; a cam connected to the output shaft of said timing motor; a resiliently biased pivotally mounted lever adapted to cooperate with said cam and said sear plate for cocking said sear plate; means at the highest point on said cam for abruptly releasing said sear plate to cause it to actuate the valve in said can to dispense a portion of the contents of said can; and adjustable means on said sear plate adapted to cooperate with means on said cam for rendering said sear plate ineffective, whereby the valve in said can is shut to discontinue further dispensing of the contents of said can.

6. In a dispensing apparatus for periodically acting to dispense a portion of the contents from an aerosol can having a valve means normally spring urged to a position preventing the dispensing of material within said can, the combination comprising means for supporting said can; means for supporting a reciprocable plate having a cap adapted to engage the valve of said aerosol can; a sear plate pivotally connected to said reciprocable plate; tab means on said sear plate; an adjusting screw in said tab means; a timing motor and means for supporting said timing motor; a cam connected to the output shaft of said timing motor; a spring; tab means on said cam adapted to engage the end of said adjusting screw; means responsive to the rotation of said cam for storing energy in said spring and for cocking said sear plate; and means at the highest point on said cam for abruptly releasing said sear plate to cause it to actuate the valve in said can to dispense a portion of the contents of said can, the tab means on said cam engaging said adjusting screw, whereby the valve in said can is shut to discontinue further dispensing of the contents of said can.

7. In a dispensing apparatus for periodically acting to dispense a portion of the contents from an aerosol can having a valve means normally spring urged to a position preventing the dispensing of material within said can, the combination comprising means for supporting said can; means for supporting a movable sear plate; a timing motor and means for supporting said timing motor; a cam connected to the output shaft of said timing motor; a triangularly formed spring anchored at the axis of rotation of said cam, one leg of which acts against an abutment, and the free end of another leg thereof contacts said cam; a cam surface and notch on said sear plate adapted also to engage the free end of the other leg of said spring, whereby upon rotation of said cam, the free end of said other spring leg is moved into said notch, storing energy in said spring; means at the highest point on said cam for abruptly releasing said sear plate to cause it to actuate the valve in said can to dispense a portion of the contents of said can; and means on said cam for rendering said sear plate ineffective, whereby the valve in said can is shut to discontinue further dispensing of the contents of said can.

8. A dispenser as claimed in claim 7 in which means is provided for supporting batteries for operating said timing motor.

9. In a dispensing apparatus for periodically acting to dispense a portion of the contents from an aerosol can having a valve means normally spring urged to a position preventing the dispensing of material within said can, the combination comprising means for supporting said can; a single sear plate means for supporting a movable sear plate in cocking relationship; a timing motor and means for supporting said timing motor; a spring; a cam connected to the output shaft of said timing motor follower means responsive to the rotation of said cam for storing energy in said spring and for cocking said sear plate follower means at the highest point on said cam for abruptly releasing said sear plate to cause it to actuate the valve in said can to dispense a portion of the contents of said can; and means on said cam for rendering said sear plate ineffective, whereby the valve in said can is shut to discontinue further dispensing of the contents of said can, means provided for supporting batteries for operating said timing motor.

10. In a dispensing apparatus for periodically acting to dispense a portion of the contents from an aerosol can having a valve means normally spring urged to a position preventing the dispensing of material within said can, the combination comprising means for supporting said can; means for supporting a movable sear plate; a timing motor and means for supporting said timing motor; a cam connected to the output shaft of said timing motor; a triangularly formed spring anchored at the axis of rotation of said cam, one leg of which acts against an abutment, and the free end of another leg thereof contacts said cam; a cam surface and notch on said sear plate adapted also to engage the free end of the other leg of said spring; another spring normally urging said sear plate toward cocking position, whereby upon rotation of said cam, the free end of said other spring leg is moved into said notch, storing energy in said spring; means at the highest point on said cam for abruptly releasing said sear plate to cause it to actuate the valve in said can to dispense a portion of the contents of said can; and means on said cam for rendering said sear plate ineffective, whereby the valve in said can is shut to discontinue further dispensing of the contents of said can.

11. In a dispensing apparatus for periodically acting to dispense a portion of the contents from an aerosol can having a valve means normally spring urged to a position preventing the dispensing of material within said can, the combination comprising a housing including horizontal partition means dividing said housing into compartments, the bottom wall of the lower compartment including a hole adapted removably to receive a resilient connector attached to the top of an aerosol can, and the side wall of said lower compartment having an opening through which a spray from said can passes upon actuating the valve in said can; a timing motor mounted in another of said compartments having its output shaft extending into said lower compartment; a sear plate mounted on the undersurface of said partition; compressible spring means also mounted on said partition including a free end that cooperates with cam surfaces on said sear plate; a rotatable cam connected to the output shaft of said motor and also engaging the free end of said spring means, said cam being adapted to cock said spring and sear plate; means on said sear plate for operating the valve in said can when said cam releases said spring means; and means on said cam for rendering said sear plate ineffective, whereby the spring urged valve in said can returns said sear plate to its initial position preparatory to another cocking operation.

12. In a dispensing apparatus for periodically acting to dispense a portion of the contents from an aerosol can having a valve means normally spring urged to a position preventing the dispensing of material within said can, the combination comprising a housing including horizontal partition means dividing said housing into compartments, the bottom wall of the lower compartment including a hole adapted removably to receive a resilient connector attached to the top of an aerosol can, and the side wall of said lower compartment having an opening through which a spray from said can passes upon actuating the valve in said can; a timing motor mounted in another of said compartments having its output shaft extending into said lower compartment; a sear plate mounted on the undersurface of said partition; compressible spring means also mounted on said partition including a free end that cooperates with cam surfaces on said sear plate; a rotatable cam connected to the output shaft of said motor and also engaging the free end of said spring means, said cam being adapted to cock said spring means and sear plate; means on said sear plate for operating the valve in said can when said cam releases said spring means; means on said cam for rendering said sear plate ineffective, whereby the spring urged valve in said can returns said sear plate to its initial position preparatory to another cocking operation; and battery means within said other compartment for operating said timing motor.

13. In a dispensing apparatus for periodically acting to dispense a portion of the contents from an aerosol can having a valve means normally spring urged to a position preventing the dispensing of material within said can, the combination comprising a housing including horizontal partition means dividing said housing into compartments, the bottom wall of the lower compartment including a hole adapted removably to receive a resilient connector attached to the top of an aerosol can, and the side wall of said lower compartment having an opening through which a spray from said can passes upon actuating the valve in said can; a timing motor mounted in another of said compartments having its output shaft extending into said lower compartment; a pivotally mounted sear plate having a tab that contacts the valve means of said can; a spiral face cam connected to the output shaft of said motor; a leaf spring extending through a slot in said sear plate and engaging said cam; means on said cam for cocking said sear plate and spring; means on said cam for abruptly releasing said sear plate to actuate said valve means; and means on said cam for deflecting said spring to release it from said sear plate.

14. In a dispensing apparatus for periodically acting to dispense a portion of the contents from an aerosol can having a valve means normally spring urged to a position preventing the dispensing of material within said can, the combination comprising a housing including horizontal partition means dividing said housing into compartments, the bottom wall of the lower compartment including a hole adapted removably to receive a resilient connector attached to the top of an aerosol can, and the side wall of said lower compartment having an opening through which a spray from said can passes upon actuating the valve in said can; a timing motor mounted in another of said compartments having its output shaft extending into said lower compartment; a sear plate pivotally mounted to the side wall of said housing and having a tab that contacts the valve means of said can; a spiral face cam connected to the output shaft of said motor; a leaf spring extending through a slot in said sear plate and engaging said cam; means on said cam for cocking said sear plate and spring; means on said cam for abruptly releasing said sear plate to actuate said valve means; and means on said cam for deflecting said spring to release it from said sear plate.

15. In a dispensing apparatus for periodically acting to dispense a portion of the contents from an aerosol can having a valve means normally spring urged to a position preventing the dispensing of material within said can, the combination comprising a housing including horizontal partition means dividing said housing into compartments, the bottom wall of the lower compartment including a hole adapted removably to receive a resilient connector attached to the top of an aerosol can, and the side wall of said lower compartment having an opening through which a spray from said can passes upon actuating the valve in said can; a timing motor mounted in another of said compartments having its output shaft extending into said lower compartment; a pivotally mounted sear plate having a tab that contacts the valve means of said can; a spiral face cam connected to the output shaft of said motor; a leaf spring extending through a slot in said sear plate and engaging said cam, said slot having angularly disposed portions; means on said cam acting with spring means other than said leaf spring for cocking said sear plate and leaf spring by causing said leaf spring to move from one to the other of the angular portions of said slot; means on said cam for abruptly releasing said sear plate to actuate said valve means; and means for causing said leaf spring to be released from said sear plate.

16. In a dispensing apparatus for periodically acting to dispense a portion of the contents from an aerosol can having a valve means normally spring urged to a position preventing the dispensing of material within said can, the combination comprising a housing; means within said housing for supporting an aerosol can; a timing motor and means within said housing for supporting said timing motor; means for supporting a sear plate within said housing, said sear plate including an opening through which said motor shaft extends; a rotatable cam fixed to said motor shaft; a spiral spring having its one end anchored in said housing and its free end riding on the surface of said rotatable cam; cam surfaces within the opening in said sear plate adapted to cooperate with the free end of said spiral spring to cock said sear plate; and means on said rotatable cam for releasing said sear plate and for rendering it ineffective.

17. In a dispensing apparatus for periodically acting to dispense a portion of the contents from an aerosol can having a valve means normally spring urged to a position preventing the dispensing of material within said can, the combination comprising a housing; means within said housing for supporting an aerosol can; a timing motor and means for supporting said timing motor within said housing; a sear plate mounted for movement within said housing and including a tab resting on the top of the valve of said can, said sear plate including an opening through which the output shaft of said timing motor extends; a rotatable cam fixed to said motor shaft; a spiral spring having its one end anchored within said housing, and its free end riding on the surface of said rotatable cam; cam surfaces within the opening in said sear plate adapted to cooperate with the free end of said spiral spring to cock said sear plate; and means on said rotatable cam for releasing said sear plate and for rendering it ineffective.

References Cited

UNITED STATES PATENTS

| | | | |
|---|---|---|---|
| 2,961,129 | 11/1960 | Bullock | 222—333 X |
| 2,971,382 | 2/1961 | Harris | 239—70 X |
| 3,018,056 | 1/1962 | Montgomery | 239—70 |

ROBERT B. REEVES, *Primary Examiner.*

HADD S. LANE, *Examiner.*